No. 694,774. Patented Mar. 4, 1902.
K. O. MUEHLBERG.
CENTER SQUARE.
(Application filed July 5, 1901.)
(No Model.)
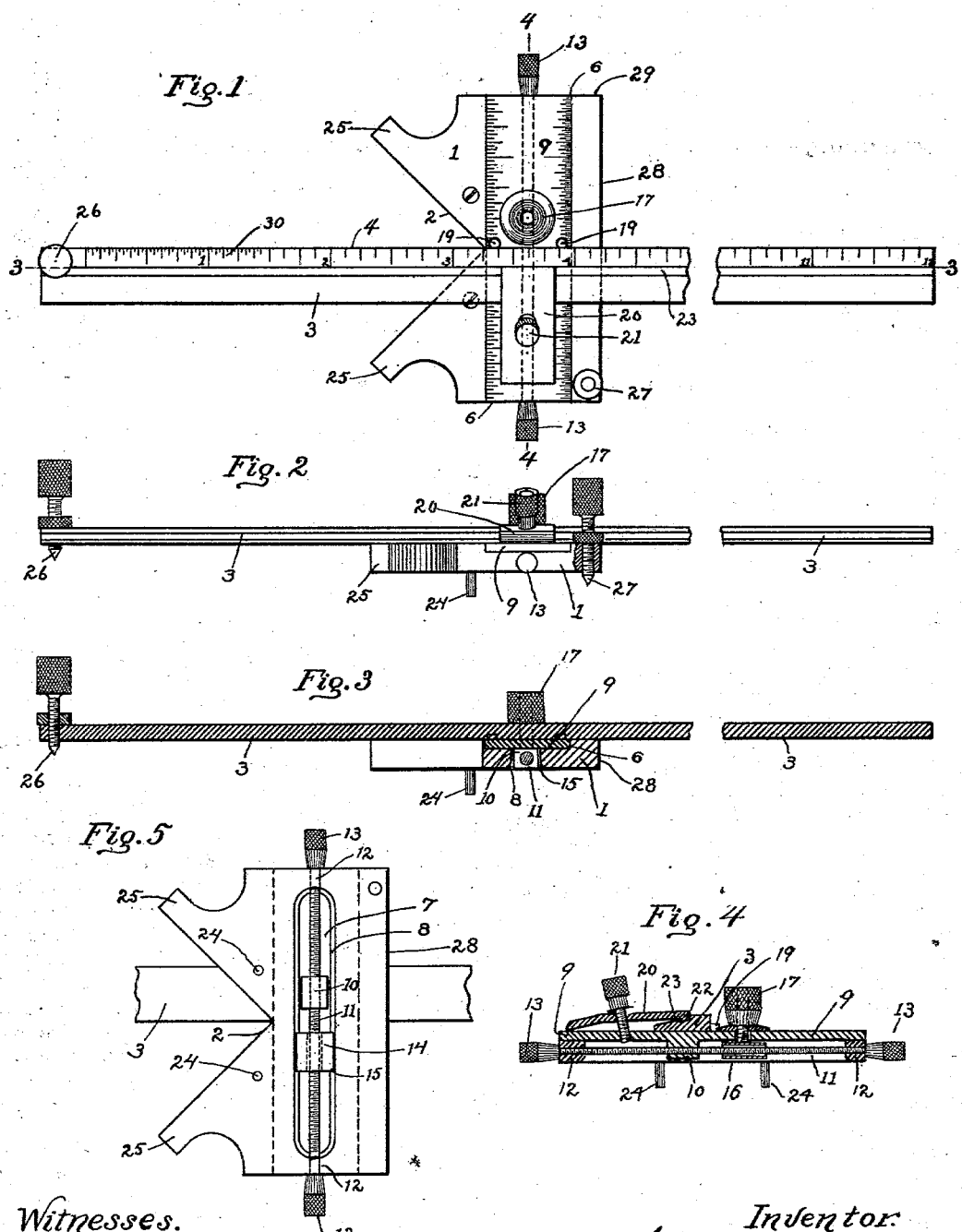

UNITED STATES PATENT OFFICE.

KARL O. MUEHLBERG, OF BRADDOCK, PENNSYLVANIA.

CENTER-SQUARE.

SPECIFICATION forming part of Letters Patent No. 694,774, dated March 4, 1902.

Application filed July 5, 1901. Serial No. 67,171. (No model.)

*To all whom it may concern:*

Be it known that I, KARL O. MUEHLBERG, a resident of Braddock, in the county of Allegheny and State of Pennsylvania, have invented a new and useful Improvement in Center-Squares; and I do hereby declare the following to be a full, clear, and exact description thereof.

My invention relates to center-squares; and its object is to provide a center-square with an adjustable arm or rule, so as to compensate for wear or defects in construction, thereby insuring that the center line will always be accurately drawn and also permitting the drawing of lines parallel to said center line, to provide a center-square which can be centered either on the outside of a solid body or the inside of a circular hole, and to provide a center-square which can be used either as a T-square, as a try-square, as a parallel or circular scribe, or as a graduated rule.

In the accompanying drawings, Figure 1 is a plan view of my improved center-square. Fig. 2 is a side view of the same. Fig. 3 is a longitudinal section on the line 3 3, Fig. 1. Fig. 4 is a transverse section on the line 4 4, Fig. 1; and Fig. 5 is a bottom plan view.

My center-square comprises the body 1, which is provided on its forward edge with the centering-angle 2. Mounted on the body is the arm 3, which normally is in such position that its edge 4 exactly divides the centering-angle 2, so that when the centering-angle 2 is placed against the outside of a circular object the edge 4 of the arm will form the center line of said body, as will be readily understood. The body 1 is provided on its upper surface with a groove 6, extending across the same at right angles to the center line of the angle 2, and the said body is provided with the slot or opening 7, which extends almost entirely across the body, said slot being in the central line of the groove 6 and having the lower edge of its walls beveled off, as shown at 8. Mounted in the groove 6 is a slide 9, provided with the depending block 10, which projects down into the groove 7 and which is provided with a screw-threaded hole for receiving the adjusting-screw 11. This screw is mounted in the portions 12 of the body at the end of the groove 7 and is provided with milled heads 13 at both ends, whereby the screw can be turned to adjust the slide 9 laterally on the body 1 of the square. Also moving in the groove 7 is a block 14, which is provided with beveled projections 15 on its edges which are adapted to engage the beveled walls 8 of the groove 7. This block is provided with a hole which is sufficiently large to allow the screw 11 to pass freely therethrough. On the upper side of the block is formed or suitably attached a screw 16, extending up through an opening in the slide 9 and which receives the milled nut 17. By means of this nut the screw 16 and block 14 can be drawn upward, thereby bringing the projections 15 of the block against the beveled walls 8 of the groove 7, thereby locking the slide in place on the body 1 in any position to which it may have been moved by the adjusting-screw 11. This slide is provided on its upper side with a suitable abutment—such, for instance, as the two pins 19, which are parallel to the center line of the angle 2—against which abutment the edge 4 of the arm 3 bears. This arm is clamped to the slide by the clamping-plate 20 and screw 21, said plate having one end bent downward and bearing on the upper face of the slide and having its opposite end provided with a bead or rib 22, fitting in a groove 23 of the arm 3. By means of the abutment 19 and clamping-plate 20 the arm 3 is secured firmly to the slide 9, with its edge 4 parallel to the center line of the angle 2, and by means of the screw 11 the slide 9, together with the arm 3, may be adjusted laterally, so as to bring the edge 4 of the arm to coincide with the center line of the angle 2 or to lie parallel thereto at any desired distance therefrom. When thus adjusted, the arm and slide are clamped in place by means of the nut 17.

Projecting from the lower side of the body 1 is an abutment, such as the pins 24, which serve to center the device on the inside of a circular hole or tubular body—that is, by placing these pins in the hole or tubular body and in contact with the inner wall thereof the edge 4 of the arm will form the center line of said hole or tubular body. In case the hole or tubular body is of sufficient size to receive the entire body of the center-square then the projecting horns 25 will be caused to bear against the inside of the hole or tubular body, these horns being accurately formed with reference to the angle 2. The abutment, such as the pins 24, must of course also be accurately placed with reference to this angle. These pins 24 will also serve, in conjunction with a scribing-point, such as the pointed screw 26 in the outer end of the arm 3, as an ordinary parallel scribe—that is, by causing the said pins 24 to bear against the edge of any object and moving the instrument parallel with the edge of the body a line will be formed by the point 26 parallel with said edge. To serve as a circular scribe, the point 26 is used in conjunction with a point such as the pointed screw 27 in the body. The arm 3 is adjusted in the clamp 20 until the desired distance between the points 26 and 27 is secured, and then by using one of these points, such as the point 27, as a center the other point can be used as a scribe to describe an arc about said center.

The rear edge 28 of the body is formed straight and at right angles to the center line of the angle 2, so that said edge 28, together with the edge 4 of the arm 3, can be used either as a T-square or as a try-square. The ends of the body are also formed straight and at right angles to the edges of the slide 9, and the edges of this slide are graduated, as shown, so that the distance to which the arm 3 is adjusted from the center line of the angle 2 can be readily ascertained. The slide 9 may be adjusted so far beyond either end of the body that the edge thereof, together with the end 29 of the body, will form a very small square, and the graduations on the edge of the slide will enable the square to be formed of any dimension desired. The arm 3 is provided with the graduations 30, thereby enabling it to be used as an ordinary graduated rule.

It will thus be seen that my center-square is so constructed that it can be used to center either on the outside of circular bodies or from the inside of circular tubular bodies or holes, that it can be used either as a try-square, T-square, a parallel scribe or circular scribe, and that the adjustment of the arm 3 by means of the slide 9 enables the edge 4 of said arm to be brought into exact coincidence with the center line of the angle 2, thereby compensating for wear or defects in construction and making the instrument perfectly accurate, or that by these means the said arm may be adjusted to any desired distance to either side of the center line, thereby enabling the user to lay off work wherein the lines are parallel to but at one side of the center line of a circular body.

What I claim as my invention, and desire to secure by Letters Patent, is—

1. In a center-square, the combination with a body provided with a centering-angle and a transverse slot therethrough, of a slide mounted thereon, said slide being provided with a screw-threaded block projecting through the slot in the body, a screw mounted in said body and passing through said block for adjusting the slide laterally, and an arm carried by the slide.

2. In a center-square, the combination with a body provided with a centering-angle and a transverse slot therethrough, of a slide mounted thereon, said slide being provided with a screw-threaded block projecting down through the slot in the body, a screw mounted in said body and passing through said block for adjusting the slide laterally, means for clamping the slide in its adjusted position to the body, and an arm carried by the slide.

3. In a center-square, the combination with a body provided with a centering-angle and a transverse slot therethrough, said slot being provided with beveled side walls, of a slide mounted on the body, said slide being provided with a screw-threaded block projecting through the slot in the body, a screw mounted in said body and passing through said block for adjusting the slide laterally, an arm carried by the slide, a block moving in the slot of the body and having beveled faces engaging the beveled side walls of the slot and provided with an enlarged hole through which the screw passes, said block being provided with a screw-threaded shank extending up through the slide, and a nut engaging said screw-threaded shank for clamping the slide to the body.

In testimony whereof I, the said KARL O. MUEHLBERG, have hereunto set my hand.

KARL O. MUEHLBERG.

Witnesses:
JAMES I. KAY,
WALTER FAMARISS.